United States Patent [19]
Ichihashi

[11] 3,855,603
[45] Dec. 17, 1974

[54] SHUTTER OPERATING CIRCUITS FOR PHOTOGRAPHIC CAMERAS

[75] Inventor: Osamu Ichihashi, Tokyo, Japan

[73] Assignee: Yashica Co., Ltd., Tokyo, Japan

[22] Filed: Nov. 13, 1973

[21] Appl. No.: 415,316

[30] Foreign Application Priority Data
Apr. 13, 1973   Japan.............................. 48-41895

[52] U.S. Cl..................................... 354/51, 354/60
[51] Int. Cl........................... G03b 7/08, G01j 1/46
[58] Field of Search............. 354/24, 29, 50, 51, 60

[56] References Cited
UNITED STATES PATENTS

| | | | |
|---|---|---|---|
| 3,626,825 | 12/1971 | Years................................ | 354/60 X |
| 3,648,053 | 3/1972 | Sato.................................. | 354/51 X |
| 3,678,826 | 7/1972 | Mori et al......................... | 354/51 |
| 3,690,230 | 9/1972 | Mori et al......................... | 354/60 X |
| 3,712,192 | 1/1973 | Ono et al.......................... | 354/51 |
| 3,731,604 | 5/1973 | Fujii et al.......................... | 354/51 X |

*Primary Examiner*—Joseph F. Peters, Jr.

[57] ABSTRACT

In a shutter operating circuit wherein the shutter time is controlled by a photoelectric transducer disposed to receive the light transmitting through the objective lens, there are provided a first amplifier for amplifying the output from the photoelectric transducer, a second amplifier having a high input impedance and operating to generate an output corresponding to the output from the first amplifier, means for feeding back the output from the second amplifier to the input of the first amplifier, a capacitor connected on the input side of the second amplifier for holding the output form the first amplifier in accordance with the opening operation of the shutter of the camera, a first impedance element connected in series with the photoelectric transducer, a second impedance element connected in parallel with the series combination of the first impedance element and the photoelectric transducer, an integrating capacitor for integrating the output from the second amplifier in accordance with the opening operation of the shutter, and a shutter trigger circuit for closing the shutter when the voltage across the integrating capacitor reaches a predetermined valve whereby the exposure time is determined by the output current from the second amplifier.

9 Claims, 7 Drawing Figures

SHUTTER OPERATING CIRCUITS FOR PHOTOGRAPHIC CAMERAS

BACKGROUND OF THE INVENTION

This invention relates to an electric shutter operating circuit of photographic cameras, more particularly, single lens reflecting cameras.

A shutter operating circuit is used for the purpose of setting a shutter time in accordance with the brightness of an object to be photographed and in a prior art shutter operating circuit a photoelectric element or transducer has been used in most cases as a light receiving element. However, in an shutter operating circuit utilizing a photoelectric element as the light receiving element it is extremely difficult to maintain at a definite value the rate of varying of the resistance value of the element for varying brightness of the object, that is the $\gamma$ value for the brightness varying over a wide range. In other words, the contrast of the picture or the quantity of light exposure of the photographic film varies with the brightness of the object. Furthermore, the photoelectric element varies its resistance with a time lag in response to the variation in the quantity of received light so that when the brightness of the object varies rapidly it is difficult to assure proper exposure due to said time lag. For this reason, it has been proposed to obviate this difficulty by providing in front of the photoelectric element an iris diaphragm of complicated shape which varies its opening in accordance with the iris setting or the sensitivity of the photographic film.

When such an iris mechanism is mounted in front of the photoelectric element it is possible to compensate for the $\gamma$ value but it is necessary to mechanically couple such iris mechanism with an ordinary iris mechanism for a lens or with a ring giving an information regarding the film sensitivity. Accordingly, the mechanism becomes extremely complicate and expensive. Furthermore, as the response characteristic of the photoelectric element is poor, when a picture is photographed by using a device which complete flashing in a short time, such as a stroboscope, it is possible to set a proper shutter time by taking into consideration such flashing of short time. Moreover, with the arrangement described above, the quantity of light impinging upon the photoelectric element is reduced in accordance with the opening of the iris diaphragm associated with the lens, the response characteristic of the photoelectric element in dark conditions becomes poor.

SUMMARY OF THE INVENTION

Accordingly, it is an object of this invention to provide an improved shutter operating circuit for a photographic camera wherein the response of the circuit is greatly improved.

A further object of this invention is to provide an improved shutter operating circuit capable of assuring a constant quantity of the light exposure for a wide range of the brightness of the object being photographed.

Still further object of this invention is to provide an improved shutter operating circuit that makes possible to manufacture the shutter at a low cost.

According to one aspect of this invention there is provided a shutter operating circuit for a photographic camera, comprising a photoelectric transducer disposed to receive the light transmitting through the objective lens of the camera, first amplifier means for amplifying the output from the photoelectric transducer, second amplifier means having a high input impedance and operating to generate an output corresponding to the output from the first amplifier means, means for feeding back the output from the second amplifier means to the input of the first amplifier means, a capacitor connected on the input side of the second amplifier means for holding the output from the second amplifier means in accordance with the opening operation of the shutter of the camera, a first impedance element connected in series with the photoelectric transducer, a second impedance element connected in parallel with the series combination of the first impedance element and the photoelectric transducer, an integrating capacitor for integrating the output from the second amplifier means in accordance with the opening operation of the shutter, and a shutter trigger circuit for closing the shutter when the voltage across the integrating capacitor reaches a predetermined value whereby the exposure time is determined by the output current from the second amplifier means which is proportional to the output from the photoelectric transducer and varied by utilizing the impedance of the first and second impedance elements as parameters.

According to another aspect of this invention there is provided a shutter operating circuit for a photographic camera, comprising a photoelectric transducer disposed to receive the light transmitting through the objective lens of the camera for producing an output corresponding to the intensity of the light, an operational amplifier having a high input impedance for amplifying said output, a feedback circuit for feeding back the output of the operational amplifier to the input thereof, an integrating capacitor connected in the feedback circuit for integrating the output from the operational amplifier in an interlocked relation with the operation of the shutter of the camera, a first impedance element connected in series with the photoelectric transducer, a second impedance element connected in parallel with the series combination of the photoelectric transducer and the first impedance element, and a shutter trigger circuit connected to the integrating capacitor for closing the shutter when the voltage across the integrating capacitor reaches a predetermined value whereby to determine the exposure time in accordance with the output from the operational amplifier which is proportional to the output of the photoelectric transducer by utilizing the impedances of the first and second impedance elements as the parameters.

BRIEF DESCRIPTION OF THE DRAWINGS

Further objects and advantages of the invention can be more fully understood from the following detailed description taken in conjunction with the accompanying drawings in which.

DESCRIPTION OF THE PREFERRED EMBODIMENTS

Figure 1:
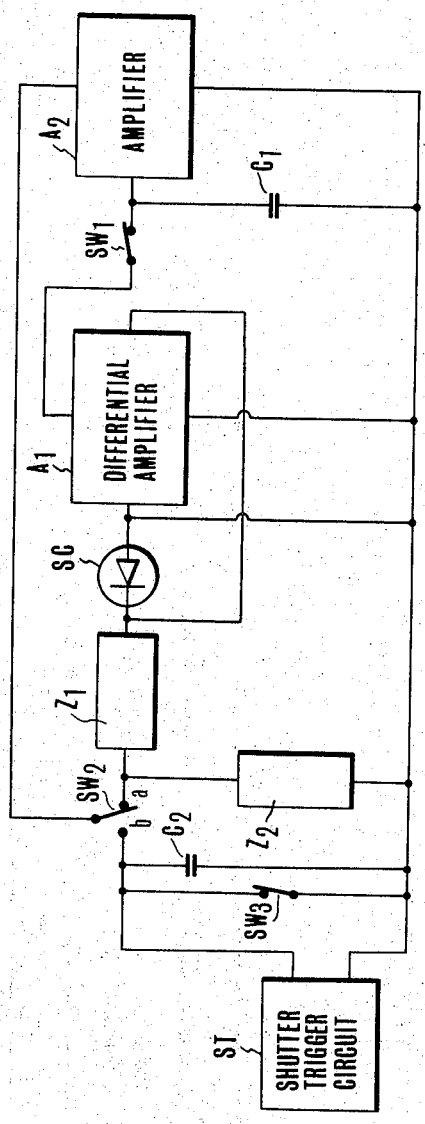
FIG. 1 is a block diagram showing the simplest form of the shutter control circuit embodying the invention.

Referring now to FIG. 1 of the accompanying drawings which shows a block diagram of the simplest form of this invention, the electric shutter operating circuit shown therein comprises a differential amplifier $A_1$, a silicon photocell SC connected between two input terminals of the differential amplifier, impedance, elements $Z_1$ and $Z_2$ serially connected between the cathode electrode of the photocell SC and the ground, an amplifier $A_2$ connected to receive the output of the differential amplifier $A_1$ via a switch $SW_1$, a current holding capacitor $C_1$ connected between the input to the amplifier $A_2$ and the ground, a shutter trigger circuit ST for the shutter of a photographic camera, not shown, a transfer switch $SW_2$ for connecting the output from amplifier $A_2$ to the juncture between impedance $Z_1$ and $Z_2$ or to the shutter trigger circuit ST, an integrating capacitor $C_2$ connected between one stationary contact $b$ of the transfer switch $SW_2$ and the ground and a switch $SW_3$ connected across the integrating capacitor $C_2$.

When the light from an object impinges upon the photocell SC through an objective lens, not shown, the photocell SC will produce an output corresponding to the quantity of the light received thereby. Since the photocell SC is connected between two inputs of the differential amplifier $A_1$, this amplifier produces an output corresponding to the output of the photocell SC. The output of the differential amplifier $A_1$ is applied to the input of amplifier $A_2$ via switch $SW_1$ and the amplified output from amplifier $A_2$ is supplied to the juncture between impedance elements $Z_1$ and $Z_2$ through transfer switch $SW_2$. Because the photocell SC produces a photocurrent $I_L$ corresponding to the quantity of the light received thereby it is possible to consider it as a source of constant current. When the output from amplifier $A_2$ is supplied to the photocell as described above, the differential amplifier $A_1$ produces an output which is amplified by amplifier $A_2$ to produce a voltage having a polarity to oppose the terminal voltage of the photocell SC. Thus, the circuit acts as an automatic balancing circuit having a negative feedback circuit. When the input resistance to amplifier $A_1$ is selected to be sufficiently high a voltage drop expressed by $I_L \cdot Z_1$ will be produced across the impedance element $Z_1$. As above described, since the terminal voltage across the photocell SC is set to be substantially zero by said automatic balancing circuit, the voltage across impedance element $Z_2$ will be equal to the voltage across the impedance element $Z_1$.

Accordingly, the current I flowing through the impedance element $Z_2$ is expressed by the following equation.

$$I_L \cdot Z_1 = I \cdot Z_2$$
$$I = Z_1/Z_2 \cdot I_L \quad (1)$$

In order that the output current $I_0$ from amplifier $A_2$ can satisfy a relation, $$I_0 = I + I_L$$

$I_0$ must be shown by $$I_0 = I + I_L = (Z_1/Z_2 + 1) \cdot I_L \quad (2)$$

Since this value is proportional to the photocurrent produced by the photocell SC, the circuit assumes a balanced condition. When switch $SW_1$ is opened under such balanced condition, because the input impedance of the amplifier $A_2$ is selected to be extremely high, the charge of the current holding capacitor $C_1$ will not leak so that the potential established prior to the opening of switch $SW_1$ can be preserved. Accordingly, amplifier $A_2$ will not be affected in any way by the opening of switch $SW_1$ but will continue to produce the output current which has been flowing prior to the opening of switch $SW_1$.

When transfer switch $SW_2$ is transferred from its stationary contact $a$ to its stationary contact $b$ concurrently with the opening of switch $SW_1$, the output current from amplifier $A_2$ will charge the integrating capacitor $C_2$, and the front curtain of a shutter, not shown, will be operated. As the capacitor $C_2$ is charged gradually until its terminal voltage reaches the threshold level $E_{Tr}$ of the trigger circuit ST at which time the trigger circuit operates to operate the back curtain of the shutter, thereby closing the shutter. With the circuit constructed as above described, the charging time T of the integrating circuit corresponds to the interval during which the shutter is maintained open, that is the shutter time. The charging time has the following relation.

$$E_{Tr} = I_0 \, T/C_2 = (Z_1/Z_2 + 1)/C_2 \cdot I_L T \quad (3)$$

As the threshold level $E_{Tr}$ is determined by the shutter trigger circuit itself, the product of the light quantity and time $I_L \cdot T$, is always constant.

Figure 2:
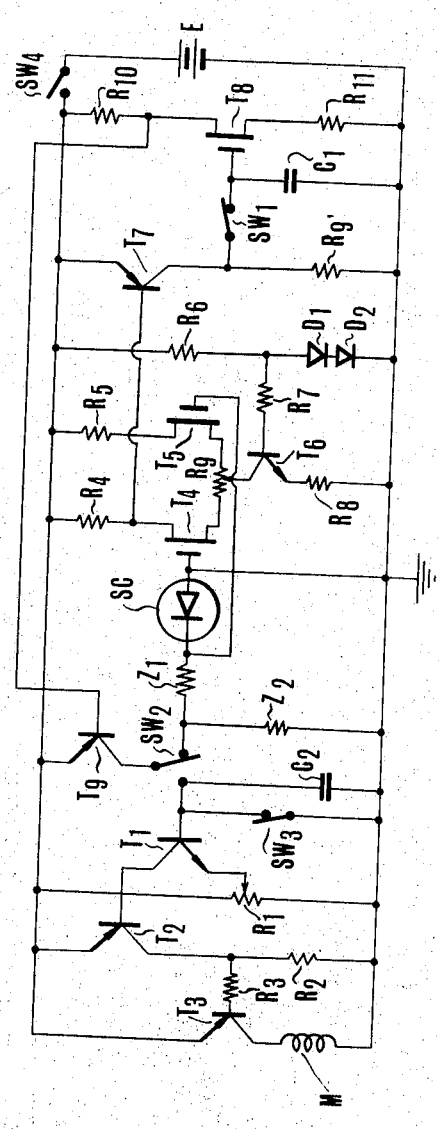
FIG. 2 is a detailed connection diagram of the circuit shown in FIG. 1.

FIG. 2 shows a connection diagram of one embodiment of the electric shutter operating circuit embodying the invention in which the same or corresponding elements as those shown in FIG. 1 are designated by the same reference characters. The circuit shown in FIG. 2 comprises a source of supply E, a source switch $SW_4$, a first transistor $T_1$ with its base electrode connected to one terminal of the integrating capacitor $C_2$, a variable resistor $R_1$ connected across the source E via source switch $SW_4$, the sliding arm of the variable resistor $R_1$ being connected to the emitter electrode of the first transistor $T_1$ for adjusting the emitter bias potential, a second transistor $T_2$ with its emitter and collector electrodes connected across the source E and its base electrode connected with the collector electrode of the first transistor $T_1$, and a third transistor $T_3$ also connected across the source E and having its base electrode connected with the collector electrode of the second transistor $T_2$ via a resistor $R_3$. An electromagnet M is connected across the source E through the third transistor $T_3$ for holding the back curtain of the shutter for predetermined time thus delaying its operation. The circuit elements thus far described constitute a shutter trigger circuit ST. There are also provided a field effect type fourth transistor $T_4$ with its gate electrode connected to the anode electrode of a photocell SC, a field effect type fifth transistor $T_5$ with its gate electrode connected to the cathode electrode of the photocell SC, resistors R₄ and R₅ respectively connected between the drain electrodes of the fourth and fifth transistors $T_4$ and $T_5$ and the positive pole of the source E and diodes $D_1$ and $D_2$ which are connected in series with a resistor $R_6$ across the source E, the diodes $D_1$ and $D_2$ providing temperature compensation of a constant current circuit comprising a sixth transistor $T_6$ which is connected to receive the terminal voltage across serially connected diodes $D_1$ and $D_2$ through a resistor $R_7$. The emitter electrode of transistor $T_6$ is connected to the ground via resistor $R_8$. The source electrodes of field effect transistors $T_4$ and $T_5$ are interconnected by a variable resistor $R_9$ having a sliding arm connected to the collector electrode of the sixth transistor $T_6$ whereby to constitute the differential amplifier $A_1$. Across the source E is connected a seventh transistor $T_7$ having a base electrode connected to the drain electrode of the field effect transistor $T_4$ and a collector electrode connected to the ground through a collector resistor $R_9$. An eighth transistor $T_8$ having an extremely high input impedance, preferably of the field effect type, is connected to receive the terminal voltage across the current holding capacitor $C_1$ as an input, the drain electrode and the source electrodes of transistor $T_8$ being connected to the positive and negative poles of the source via resistors $R_{10}$ and $R_{11}$, respectively. A ninth transistor $T_9$ is provided with its base electrode connected to the drain electrode of the field effect transistor $T_8$ and the collector electrode connected to the movable contact of transfer switch $SW_2$, thus constituting the amplifier $A_2$ shown in FIG. 1.

When the source switch $SW_4$ is closed the fourth and fifth transistors $T_4$ and $T_5$ constituting the differential amplifier $A_1$ shown in FIG. 1 are connected across the source E. Under these conditions, when the light from an object is projected under the photocell SC, the photocell produces an output corresponding to the brightness of the object. Since the photocell is connected across the gate electrodes of the fourth and fifth transistors $T_4$ and $T_5$ these transistors produce on their outputs an output voltage corresponding to the output of the photocell SC. After being amplified by transistor $T_7$, the output from the fourth and fifth transistors $T_4$ and $T_5$ is applied to the gate electrode of the field effect transistor $T_8$ via switch $SW_1$, now in the closed state. Since current holding capacitor $C_1$ is connected between the gate electrode of transistor $T_8$ and the ground, all signals supplied to this transistor via switch $SW_1$ are stored in capacitor $C_1$.

The signal supplied to transistor $T_8$ is amplified by transistors $T_8$ and $T_9$ and is applied to the juncture between impedance elements $Z_1$ and $Z_2$. Consequently, the circuit constructed as described above operates as a negative feedback circuit and the circuit will be balanced when the negative feedback signal reaches a value sufficient to cancel the terminal voltage across the photocell SC. As a consequence, under the balance condition, the output from transistor $T_7$, that is the negative feedback current assumes a value corresponding to the quantity of the light impinging upon the photocell. When the circuit is balanced at which the terminal voltage across the photocell SC is nearly zero volt, there is no adverse effect caused by the dark current of the photocell.

Substantially concurrently with the operation of the front diaphragm of the shutter, switches $SW_1$, $SW_2$ and $SW_3$ are charged over, that is switches $SW_1$ and $SW_3$ are opened and switch $SW_2$ is thrown to the left hand contact so that the current holding capacitor $C_1$ continues to hold the condition existed before opening of switch $SW_1$ because the input impedance of transistor $T_8$ is extremely high. As a consequence, the outputs of transistors $T_8$ and $T_9$ are maintained substantially at the same values as those provided before opening of the switch $SW_1$. Since switch $SW_3$ is now opened, the output of transistor $T_9$, that is the feedback current is supplied to the integrating capacitor $C_2$ to gradually charge the same. When the terminal voltage across integrating capacitor $C_2$ reaches the threshold level of transistor $T_1$, this transistor is turned ON. Then transistors $T_2$ and $T_3$ connected to receive the output from transistor $T_1$ are turned ON and OFF, respectively, whereby the rear diaphragm of the shutter which has been held by electromagnet M is operated to close the shutter. The interval between the operations of the front and rear diaphragms of the shutter, that is the charging time of the integrating capacitor $C_2$, represents the shutter time. As it is possible to adjust the threshold level of transistor $T_1$ by varying the variable resistor $R_1$, it is advantageous to vary this resistor $R_1$ in accordance with the sensitivity of the film used.

In this manner, the disclosed shutter operating circuit provides a correct shutter time corresponding to the quantity of light received by the photoelectric element without any trouble caused by the time lag of the photoelectric element at the time of quick variation of the light and by the dark current of the photoelectric element. Transistor $T_6$ is effective to stabilize the circuit operation by improving the percentage of removing the in-phase component of the differential amplifier $A_1$, while diodes $D_1$ and $D_2$ function to compensate for the temperature characteristic of transistor $T_6$ acting as a constant current source and for the voltage variation of the source.

Figure 3:
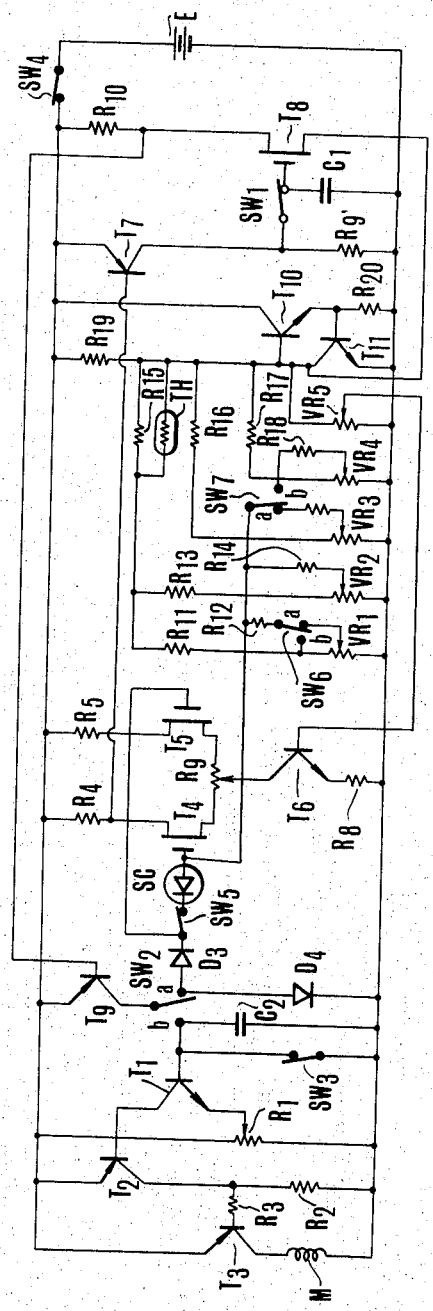
FIG. 3 is a connection diagram of a modified embodiment of this invention.

FIG. 3 shows another embodiment of this invention in which the same or corresponding elements to those shown in FIG. 2 are designated by the same reference charactors. In the modification shown in FIG. 3, diodes $D_3$ and $D_4$ are substituted for the impedance elements $Z_1$ and $Z_2$ utilized in the embodiment shown in FIG. 2, and tenth and eleventh transistors $T_{10}$ and $T_{11}$ are provided to form a constant voltage circuit. Furthermore, variable resistors $VR_1$ through $VR_6$ are provided to set such informations as the ASA sensitivity of the photographic film used, and the iris opening at the time of measuring light. Further, resistor $R_{11}$ through $R_{20}$ and switches $SW_5$, $SW_6$ and $SW_7$ are connected as shown.

In operation, when switch $SW_5$ is closed, photocell SC produces a photocurrent $I_L$ proportional to the quantity of light received, thereby to produce a voltage drop $E_1$ across diode $D_3$. When the characteristic of diode $D_3$ is expressed by an equation $Id = Is \cdot exp(qE_1/kT)$ where $Id$ represents a current flowing through the diode $D_3$, $Is$ the saturation current thereof, $q$ the electric charge of an electron, E the terminal voltage across the diode $D_3$, K the Boltzman's constant and T the absolute temperature (°K) since $Id = I_L$, the photocurrent $I_L$ is expressed by $I_L = Is \cdot exp(qE_1/rT)$. Accordingly, the voltage drop across diode $D_3$ is expressed by $$E_1 = (KT/q)\, ln\, (I_L/Is)$$

A voltage expressed by an equation $E_2 = (KT/q) \ln 2^n$ is impressed upon the cathode electrode of diode $D_3$. Since the terminal voltage of the photocell SC is set to be substantially zero volt by the balancing operation of the negative feedback circuit described above, the voltage $E_3$ impressed across diode $D_4$ is equal to $(E_1 + E_2)$, namely $$E_3 = E_1 + E_2$$
$$= KT/q \{\ln (I_L/I_S) + \ln 2^n\}$$
$$= (KT/q) \ln (2^n \cdot I_L/I_S) \qquad (5)$$

In this example, resistor $VR_1$ is used to set an information regarding iris opening, resistor $VR_2$ is used to set informations regarding ASA sensitivity and manual shutter, resistor $VR_4$ is used to automatically adjust the sensitivity of the circuit, and resistor $VR_3$ to manually adjust the shutter. Resistors $VR_1$ through $VR_5$ are of the same type and switches $SW_6$ and $SW_7$ are thrown to their stationary contacts a for automatic operation. Accordingly, at the time of automatic operation, one-third of the voltages across resistors $VR_1$ and $VR_2$ is impressed upon the cathode electrode of the photocell SC. Under these conditions, in order to avoid errors in various information regarding ASA sensitivity and iris opening, it is necessary to set these resistors at low values.

As describe above, since voltage drop E is created across diode $D_4$ as has been pointed out herein above, if the characteristics of diodes $D_3$ and $D_4$ were identical. The current $I_2$ flowing through diode $D_4$ could be expressed as follows:

$$I_2 = I_S \exp (q/KT) E_3$$
$$= I_S \exp (q/KT) (KT/q(\ln) 2^n I_L/I_S)$$
$$= 2^n \cdot I_L \qquad (6)$$

At this time, when a voltage expressed by $$E_2 = (KT/q) \ln 2^n = (KT/q) \ln 2 \cdot n$$
$$(7)$$

is impressed upon the cathode electrode of the photocell SC, a current $2^n$ will be produced on the output. Accordingly, even when the sum of three voltages, that is $n =$ ASA information + iris opening information + sensitivity adjustment is impressed, since the resistors impressed with these voltages may be constructed to vary linearly their resistances, it is possible to readily set a large number of informations. Where $n$ is selected such that $2^n > 1$, the collector current $I_0$ of transistor $T_9$ is nearly equal to $I_2$, so that when switch $SW_1$ is turned OFF and switch $SW_2$ is transferred to stationary contact b, the time required by the voltage across the integrating capacitor $C_2$ to reach the threshold level of the shutter trigger circuit ST is expressed by the following equation $$E_{Tr} = I_0 T/C_2 = I_2 T/C_2 = 2^n/C_2 \cdot I_L \cdot T$$
$$(8)$$

where $C_2$ represents the capacitance of capacitor $C_2$. Thus, a condition wherein $I_L T_1$ that is the light quantity, is constant is fulfilled.

In the embodiment shown in FIG. 2, it is also possible to give an information by impressing a voltage $E = A2^2$ (where $n = 1, 2 \ldots$) upon the cathode electrode of photocell SC. Further, the transistors which constitute the differential amplifier should operate with a base or gate current which is sufficiently smaller than the photocurrent produced by the photocell. Where MOSFETs are used their gate leakage current is smaller than 10 PA so that such gate leakage current is negligible. The type of the amplifiers included in the succeeding stages is determined depending upon the capacitance of the current holding capacitor and the time required for storing. If a high degree of accuracy is desired, MOSFET is preferred.

As described above, the invention provides a novel shutter operating circuit capable of using a photocell as a light receiving element without being adversely effected by the dark current of the photocell thus eliminating the problem of time lag which has been inevitable in the prior art shutter operating circuit when the high quantity varies quickly.

Further, the novel shutter operating circuit of this invention permits ready setting of informations regarding ASA sensitivity, iris opening or the like and the resistors utilized to set such informations may be resistors which vary their resistances linearly so that it is possible to readily set a large number of informations. As a differential amplifier having an extremely high input impedance is used as the first amplifier, it is possible to make effective use of the characteristic of the photocell and to greatly simplify the circuit construction.

Figure 4:
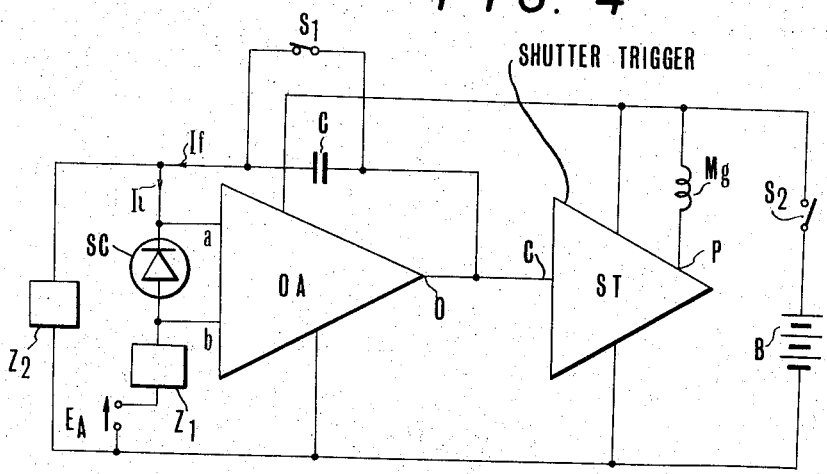
FIG. 4 is a diagrammatic block diagram of another embodiment of this invention.

In the following modified embodiments an operation amplifier is substituted for the first and second amplifiers utilized in the preceding embodiments. Fig. 4 shows a basic block diagram of such a modified embodiment which comprises an operational amplifier OA having a high input resistance and differential input terminals a and b across which is connected a photocell SC with a polarity as shown, the photocell being disposed to receive the light from an object to be photographed through an objective lens of the camera. The differential input terminal a of the operational amplifier OA is connected to an impedance element $Z_2$ while the differential input terminal b is connected via an impedance element $Z_1$ to a terminal EA to which is given an information regarding the iris opening or the ASA sensitivity.

An integrating capacitor C is connected between the output terminal O of the operational amplifier OA and input terminal a and a switch $S_1$ interlocked with the shutter such that the switch is opened when the shutter is opened is connected across the capacitor C for normally short circuiting the same. The output terminal O of the operational amplifier OA is also connected to the input terminal c of a shutter trigger circuit ST having an output terminal p connected to an electromagnet Mg for closing the shutter. The electromagnet Mg is constructed such that it is deenergized when the potential impressed upon the input terminal c of the shutter trigger circuit ST exceeds a predetermined value. A source of supply B is connected to the shutter operating circuit ST through a source switch $S_2$. Instead of providing the first impedance element $Z_1$ on the anode electrode side of the photocell SC, the impedance can be provided on the cathode electrode side.

Figure 7:
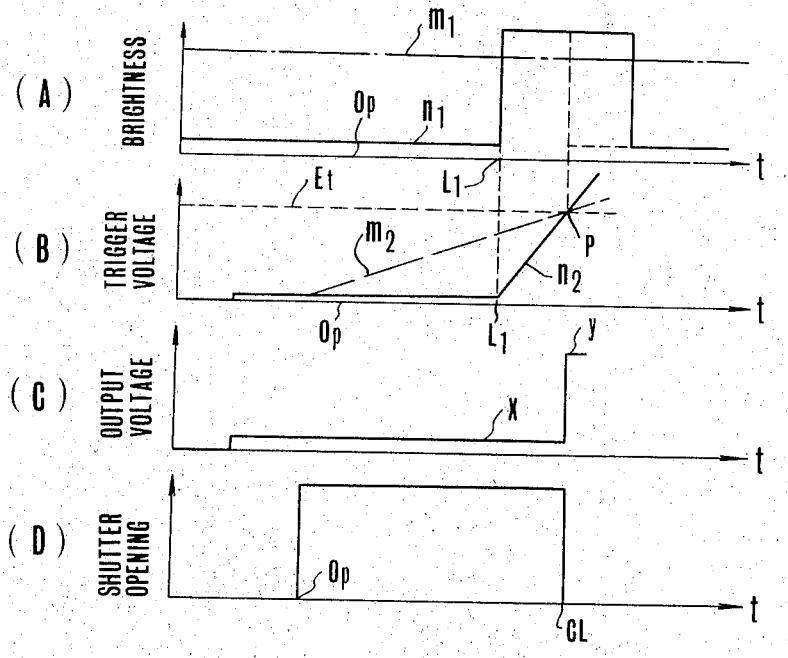
FIGS. 7A through 7D are characteristic curves helpful to explain the operation of the embodiments shown in FIGS. 4 and 5.

When the camera is directed toward the object to project the light from the object upon the photocell SC, the operational amplifier OA begins to operate. When a shutter release button (not shown) of the camera is depressed at this time, switch $S_1$ interlocked therewith is opened at a point OP shown in FIGS. 7A through 7B. Then, the charging of the integrating capacitor C by a current $I_f$ fed back from the operational amplifier OA is commenced. If the brightness of the object does not vary, the information thereof has a constant value as shown by a dot and dash line $m_1$ shown in FIG. 7A. As the terminal voltage across capacitor C builds up which is charged by the light from the object, the voltage appearing at the output terminal O of the operational amplifier OA also builds up as shown by dot and dash lines $m_2$ shown in FIG. 7B. When this voltage reaches at point P the trigger voltage $E_1$ of the shutter trigger circuit ST shown in FIG. 7B, the voltage appearing at the output terminal of the shutter trigger circuit ST varies from a level $x$ to a level $y$ as shown in FIG. 7C. At the level $y$, electromagnet $M_g$ is deenergized to close the shutter. During an interval OP-CL shown in FIG. 7D the shutter is maintained opened. Solid line curves $n_1$ and $n_2$ shown in FIGS. 7A and 7B show an operation wherein the shutter is interlocked with a strobo flash. More particularly, the shutter release button, not shown, is depressed at the instant OP shown in FIGS. 7A and 7B, and at an instant $L_1$ the strobo flash begins to luminesce. The light caused by this flash is projected upon the photocell SC from the object so that the voltage appearing at the operational amplifier OA begins to build up as shown by a solid line $n_2$ shown in FIG. 7B. When this voltage reaches the trigger voltage $Et$ of the shutter trigger circuit ST at point P the output voltage from the shutter trigger circuit ST jumps from $x$ to $y$ as shown in FIG. 7C. Thus, the electromagnet $Mg$ is deenergized thereby completing the shutter control.

Figure 5:
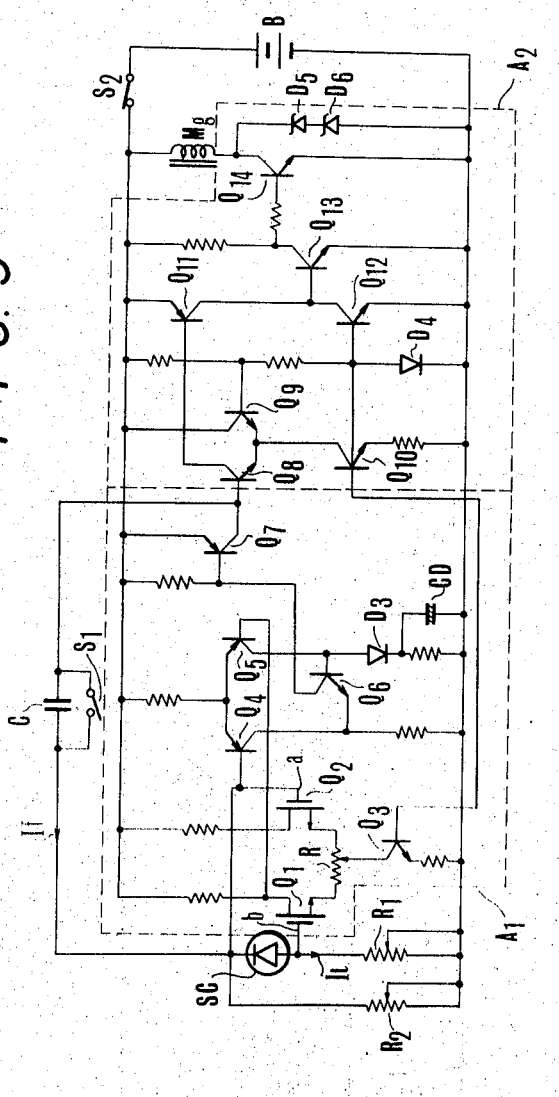
FIG. 5 is a detailed connection diagram of the control circuit shown in FIG. 4.

FIG. 5 shows a detailed connection of the circuit diagrammatically shown in FIG. 4. In the circuit shown in FIG. 5, variable resistors $R_1$ and $R_2$ are used as the impedance elements $Z_1$ and $Z_2$ shown in FIG. 4 and it is assumed that the information impressed across terminals EA has a voltage of 0 volt. Elements shown in FIG. 5 which are identical to those shown in FIG. 4 are designated by the same reference characters and $Q_1$ and $Q_2$ show MOS type field effect transistors, $Q_3$ through $Q_{14}$ bipolar transistors, $r$ a resistor, $R$ a variable resistor, $Q_3$ and $Q_4$ diodes, $D_5$ and $D_6$ Zener diodes, and CD an electrolytic capacitor.

In operation, when the shutter release button is depressed after directing the camera toward the object to be photographed, switch $S_1$ interlocked with the shutter release button is opened. Concurrently therewith the light from the object is received by the photocell SC to produce a photocurrent $Il$ which is expressed by the following equation $$I = Is\ (exp\ (qE/nKT) - 1) - Il$$

(9)

in which I represents the total current flowing through the photocell, $Is$ the saturation current thereof, $q$ the electric charge of an electron, E the terminal voltage across the photocell SC, $n$ a constant determined by the junction of the photocell, K the Boltzman's constant and T the absolute temperature (°K).

By the operation of the operational amplifier OA, the terminal voltage across the photocell is made to be zero and since $|Is| >> |Il|$, the total current I shown by equation (9) becomes $$I = -Il$$

(10)

While maintaining the condition shown by equation (10) the light from the object is amplified by the operational amplifier OA and is fed back to the input terminal $a$ of the operational amplifier OA from the collector electrode of transistor $Q_7$ of the amplifier through capacitor C, the feedback current being designated by $I_f$, thus gradually charging the capacitor C. At the same time photocurrent $Il$ flows through variable resistor $R_1$ thus creating a voltage drop $IlR_1$ across the variable resistor $R_1$ current $(I_f - Il)$ flows through the variable resistor $R_2$ so that a voltage drop $(I_f - Il) R_2$ is produced across resistor $R_2$. Since the voltage across the photocell SC is zero, $Il R_1 = (I_f - Il) R_2$. The feedback current $I_f$ is expressed by the following equation $$I_f = (R_1/R_2 + 1)\ Il$$

(11)

As can be noted from this equation, the feedback current is equal to $(R_1/R_2 + 1)$ times of the photocurrent $Il$ so that it is possible to amplify current $Il$ by suitably selecting the values of resistors $R_1$ and $R_2$. As described above, capacitor C is charged by feedback current $I_f$ and the voltage across the capacitor C and the output voltage from the operational amplifier OA increase proportionally, the interval $T_1$ required for the capacitor voltage to build up to the trigger voltage $Et$ of the shutter trigger circuit ST is expressed by the following equation since $CEt = I_f T_1$ $$T_1 = CEt/I_f = CEt/((R_1/R_2) + 1)$$

(12)

At an instance when this equation is satisfied, transistor $Q_{14}$ of the shutter trigger circuit ST is turned OFF so that the electromagnet Mg is deenergized to close the shutter.

To assure the operation described above, it is necessary to maintain the quantity of the light arriving at the film of the cameral always at a constant value, and the circuit of this invention fulfills this requirements as follows. More particularly, since the quantity of the light is equal to the product of the brightness of the object and time, that is $Il \times T_1$, from equation (12) we obtain $$Il \cdot T_1 = CE_1/(R_1/R_2) + 1$$

(13)

Since the right hand term of this equation is constant the product $Il \times T_1$ is also a constant. In other words, with the novel shutter control circuit it is possible to project always a definite quantity of light upon the film surface. Where $R_1 >> R_2$ $$T_1 \cdot Il = (R_2/R_1)\ CE_1$$

(14)

In this equation, when the ratio between $R_2$ and $R_1$ is varied in accordance with the ASA sensitivity of the film or the iris opening, it is possible to set these informations in the circuit shown in FIG. 5.

For example, assuming ASA sensitivities of 25, 50, 100, 200, 400, 800 and 1,600, and iris openings of 1.4, 2, 2.8, 4, 5.6, 8, 11, and 16, these informations may be set in resistors $R_2$ and $R_1$ respectively as shown in the following Tables.

| ASA sensitivity | 25 | 50 | 100 | 200 | 400 | 800 | 1600 |
|---|---|---|---|---|---|---|---|
| $R_2$ | $64r_2$ | $32r_2$ | $16r_2$ | $8r_2$ | $4r_2$ | $2r_2$ | $r_2$ |

| iris opening | 1.4 | 2 | 2.8 | 4 | 8 | 11 | 16 |
|---|---|---|---|---|---|---|---|
| $R_1$ | $128r_1$ | $64r_1$ | $32r_1$ | $16r_1$ | $4r_1$ | $2r_1$ | $r_1$ |

In these tables $r_2$ and $r_1$ show a resistance value of $R_2$ corresponding to ASA sensitivity of 1600 and a resistance value of $R_1$ corresponding to iris opening of 16, respectively. So long as the values of resistors $R_2$ and $R_1$ can be set as shown, informations set in these resistors may be interchanged. Further, it is also possible to fix either one of these resistors and to vary the other in accordance with the ASA sensitivity or the iris opening. Alternatively, an iris diaphragm may be provided in front of the photocell so as to present the information of both of the ASA sensitivity and the iris opening as the intensity of light in which case both resistors $R_2$ and $R_1$ may be fixed. It is also possible to set the information regarding either one of the ASA sensitivity or iris opening as the degree of opening of the iris opening disposed in front of the photocell and to process the other information by either or both of the resistors $R_2$ and $R_1$.

Figure 6:
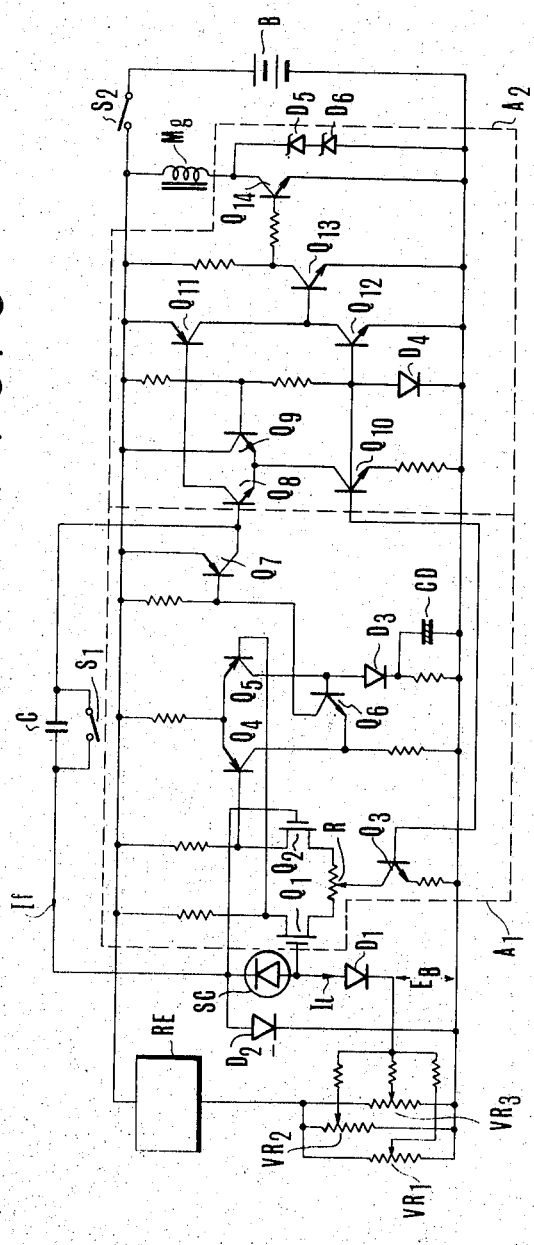
FIG. 6 shows a modification of the embodiment shown in FIG. 5.

In the embodiment shown in FIG. 6, impedance elements $Z_2$ and $Z_1$ shown in FIG. 4 are replaced by diodes $D_2$ and $D_1$ and an information regarding the ASA sensitivity and or iris opening is inserted into the shutter control circuit from a constant voltage circuit RE through variable resistors $VR_1$, $VR_2$ and $VR_3$. Again, circuit elements identical to those shown in FIGS. 4 and 5 are designated by the same reference characters. In FIG. 6, if the impedances of diodes $D_2$ and $D_1$ are expressed by $Z_2$ and $Z_1$ respectively, the photocurrent $Il$ will produce following voltage $ED_2$ across diode $D_1$ $$ED_1 = nKT/q \cdot ln\ (Il/Is) \tag{15}$$

Accordingly, a voltage $ED_2$ will be created across diode $D_2$ according to the following equation $$ED_2 = nKT/g \cdot ln\ (I_f - Il/Is) \tag{16}$$

$$ED_2 = ED_1 + E_B \tag{17}$$

wherein $E_B$ represents an information voltage regarding the ASA sensitivity or iris opening. Since, the terminal voltage across the photocell SC is zero, by putting $$E_B = (nKT/q)\ ln\ 2^e \tag{18}$$

From equations (14) through (18)

$$(Il/Is) \cdot 2^e = I_f - Il/Is \tag{19}$$

Accordingly $$I_f = Il\ (2^e + 1) \tag{20}$$

If $E_B$ were large, $2^e << 1$, thus $$I_f = 2^e\ Il \tag{21}$$

The instant at which the shutter trigger circuit ST operates on the shutter time $T_1$ can be shown as follows:

$$T_1 = CE_1/I_f = CE_t/2^e Il \tag{22}$$

and the light quantity $Il \cdot T_1$ is shown by $$Il \cdot T_1 = CE_1/2^e \tag{23}$$

Since the right hand term of equation (23) is constant, the light quantity is also constant. The information regarding the ASA sensitivity or the iris opening can be represented by $e$ of $2^e$. The information regarding the brightness of the object can be logarithmically compressed by diode $D_1$ employed in the circuit shown in FIG. 6 and logarithmically expanded by diode $D_2$. Consequently, the circuit shown in FIG. 6 can provide a positive control for the shutter.

According to the modified embodiments shown in FIGS. 4 to 6, a photoelectric transducer adapter to receive the light from an object is connected to the input of an operational amplifier, the output of the operational amplifier is fed back to its input through a capacitor so as to commence the charging thereof in an interlocked relation with the opening operation of the shutter of a camera, and to close the shutter when the voltage across the capacitor reaches a predetermined trigger voltage. Accordingly it is possible to greatly improve the response of the circuit to the brightness of the object, and to make always constant the quantity of light exposure of the photographic film over the entire range of the brightness of the object. Furthermore, as it is possible to project the light from the object over the entire surface of the photoelectric transducer, it is possible to simplify the construction of the shutter and reduce its cost. Use of a photocell greatly improves the response thereof to the light from an object of low brightness as well as the response of the control circuit as a whole. Moreover, as the measurement of light and shutter control are performed simultaneously, operation of the control circuit becomes simple. Also satisfactory flash control is possible even when an automatic storobo flash is used.

What is claimed is:

1. A shutter operating circuit for a photographic camera, comprising a photoelectric transducer disposed to receive the light transmitted through the objective lens of said camera, first amplifier means for amplifying the output from said photoelectric transducer, second amplifier means having a high input impedance and operating to generate an output corresponding to the output from said first amplifier means, means for feeding back the output from said second amplifier means to the input of said first amplifier means, a capacitor connected on the input side of said second amplifier means for holding the output from said first amplifier means in accordance with the opening operation of the shutter of said camera, a first impedance element connected in series with said photoelectric transducer, a second impedance element connected in parallel with said series combination of said first impedance element and said photoelectric transducer, an integrating capacitor for integrating the output from said second amplifier means in accordance with the opening operation of said shutter, and a shutter trigger circuit for closing said shutter when the voltage across said integrating capacitor reaches a predetermined value whereby the exposure time is determined by the output current from said second amplifier means which is proportional to the output from said photoelectric transducer and varied by utilizing the impedance of said first and second impedance elements as parameters.

2. The shutter operating circuit according to claim 1 wherein said first and second impedance elements comprise diodes having substantially the same characteristic.

3. The shutter operating circuit according to claim 1 wherein said first and second impedance elements comprise resistors having substantially the same characteristic.

4. The shutter operating circuit according to claim 2 wherein voltages corresponding to informations regarding the ASA sensitivity of the film utilized, iris opening or the like are impressed upon said first and second impedance elements.

5. The shutter operating circuit according to claim 1 wherein said first amplifier means comprises a differential amplifier circuit having an extremely high input impedance.

6. A shutter operating circuit for a photographic camera, comprising a photoelectric transducer disposed to receive the light transmitted through the objective lens of said camera for producing an output corresponding to the intensity of said light, an operational amplifier having a high input impedance for amplifying said output, a feedback circuit for feeding back the output of said operational amplifier to the input thereof, an integrating capacitor connected in said feedback circuit for integrating the output from said operational amplifier in an interlocked relation with the opening operation of the shutter of said camera, a first impedance element connected in series with said photoelectric transducer, a second impedance element connected in parallel with the series combination of said photoelectric transducer and said first impedance element, and a shutter trigger circuit connected to said integrating capacitor for closing said shutter when the voltage across said integrating capacitor reaches a predetermined value whereby to determine the exposure time in accordance with the output from said operational amplifier which is proportional to the output of said photoelectric transducer by utilizing the impedances of said first and second impedance element as the parameters.

7. The shutter control circuit according to claim 5 wherein said first and second impedance elements comprise diodes having substantially the same characteristic.

8. The shutter control circuit according to claim 5 wherein said first and second impedance elements comprise resistors having substantially the same characteristic.

9. The shutter control circuit according to claim 6 wherein voltages representing the informations regarding the ASA sensitivity of the film used and the iris opening of the camera are impressed upon said first and second impedance elements.

* * * * *